United States Patent
Kim et al.

(10) Patent No.: US 11,427,514 B2
(45) Date of Patent: Aug. 30, 2022

(54) CONTROLLED-RELEASE FERTILIZERS

(71) Applicants: LG CHEM, LTD., Seoul (KR); FarmHannong Co., Ltd., Seoul (KR)

(72) Inventors: Chanjoong Kim, Daejeon (KR); Joon Seok Lee, Daejeon (KR); Yil Jang, Daejeon (KR); Sangryeo Lee, Daejeon (KR); Ji Yeon Kim, Daejeon (KR); Jae Hoon Choe, Daejeon (KR)

(73) Assignees: LG CHEM, LTD., Seoul (KR); FARMHANNONG CO., LTD., Seoul (KR)

( * ) Notice: Subject to any disclaimer, the term of this patent is extended or adjusted under 35 U.S.C. 154(b) by 19 days.

(21) Appl. No.: 16/646,681

(22) PCT Filed: Dec. 13, 2018

(86) PCT No.: PCT/KR2018/015866
§ 371 (c)(1),
(2) Date: Mar. 12, 2020

(87) PCT Pub. No.: WO2019/117650
PCT Pub. Date: Jun. 20, 2019

(65) Prior Publication Data
US 2020/0277241 A1    Sep. 3, 2020

(30) Foreign Application Priority Data

Dec. 14, 2017 (KR) .................. 10-2017-0172272
Dec. 12, 2018 (KR) .................. 10-2018-0160288

(51) Int. Cl.
*C05G 3/40* (2020.01)
*C05G 5/12* (2020.01)
*C05G 5/35* (2020.01)
*C05G 5/30* (2020.01)

(52) U.S. Cl.
CPC .............. *C05G 3/40* (2020.02); *C05G 5/12* (2020.02); *C05G 5/35* (2020.02); *C05G 5/37* (2020.02)

(58) Field of Classification Search
None
See application file for complete search history.

(56) References Cited

U.S. PATENT DOCUMENTS 4,369,055 A * 1/1983 Fujita .................. B01J 2/30
                                              71/64.11
5,009,696 A   4/1991 Fujita et al.
(Continued)

FOREIGN PATENT DOCUMENTS

CN   101962306 B   3/2013
CN   103588561 A   2/2014
(Continued)

OTHER PUBLICATIONS

International Search Report issued for International Application No. PCT/KR2018/015866 dated Apr. 2, 2019, 4 pages.
(Continued)

*Primary Examiner* — Wayne A Langel
(74) *Attorney, Agent, or Firm* — Rothwell, Figg, Ernst & Manbeck, P.C.

(57) ABSTRACT

The present invention relates to a controlled-release fertilizer, including: a photodegradable capsule including a binder resin containing a polyolefin and an ethylene vinyl acetate copolymer, and a photocatalytic composite in which a (co)polymer including at least one repeating unit selected from the group consisting of an ethylene repeating unit and a vinyl acetate repeating unit is bonded to the surface or inside of agglomerates of inorganic fine particles; and a fertilizer contained in a space surrounded by the photodegradable capsule.

17 Claims, 2 Drawing Sheets

(56) References Cited

U.S. PATENT DOCUMENTS

| | | | |
|---|---|---|---|
| 5,300,135 A | 4/1994 | Hudson et al. | |
| 5,466,274 A | 11/1995 | Hudson et al. | |
| 5,594,343 A | 1/1997 | Clark et al. | |
| 5,795,923 A | 8/1998 | Shahid | |
| 6,500,223 B1 | 12/2002 | Sakai et al. | |
| 9,668,475 B2 | 6/2017 | Charles et al. | |
| 10,195,157 B2 | 2/2019 | Topolkaraev et al. | |
| 2005/0172858 A1* | 8/2005 | Schonherr | A23K 30/15 106/287.24 |
| 2006/0141010 A1* | 6/2006 | Karl | C05G 5/37 424/442 |
| 2013/0042659 A1 | 2/2013 | Beatty et al. | |

FOREIGN PATENT DOCUMENTS

| | | |
|---|---|---|
| CN | 103980738 A | 8/2014 |
| CN | 104557323 A | 4/2015 |
| CN | 105461429 A | 4/2016 |
| GB | 2259698 A | 3/1993 |
| JP | H11-043391 A | 2/1999 |
| KR | 10-1996-7002825 A | 5/1996 |
| KR | 10-2000-0071159 A | 11/2000 |
| KR | 10-0340610 B1 | 6/2002 |
| KR | 10-1096312 B1 | 12/2011 |
| KR | 10-1179469 B1 | 9/2012 |
| KR | 10-1331454 B1 | 11/2013 |
| KR | 10-2014-0039288 A | 4/2014 |
| KR | 10-1749007 B1 | 6/2017 |
| TW | 210995 B | 8/1993 |
| WO | 2012-147668 A1 | 11/2012 |

OTHER PUBLICATIONS

Green Pesticide and Fertilizer Intermediate, edited by Duoren Wang, Scientific and Technical Documents Publishing House, published on Apr. 30, 2009, pp. 49-50 with English translations (total 7 pages).

* cited by examiner

[FIG. 1]
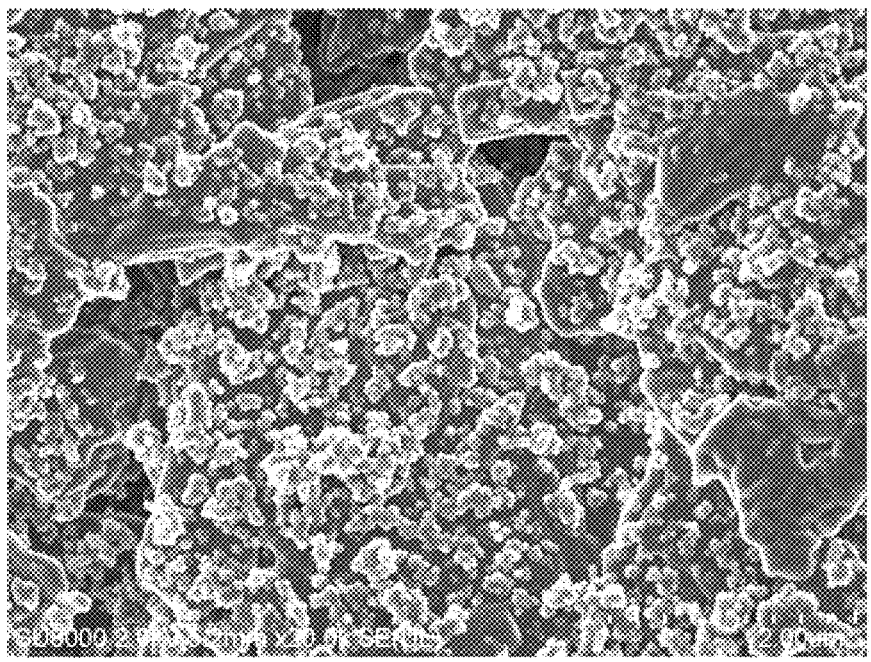
Example 1
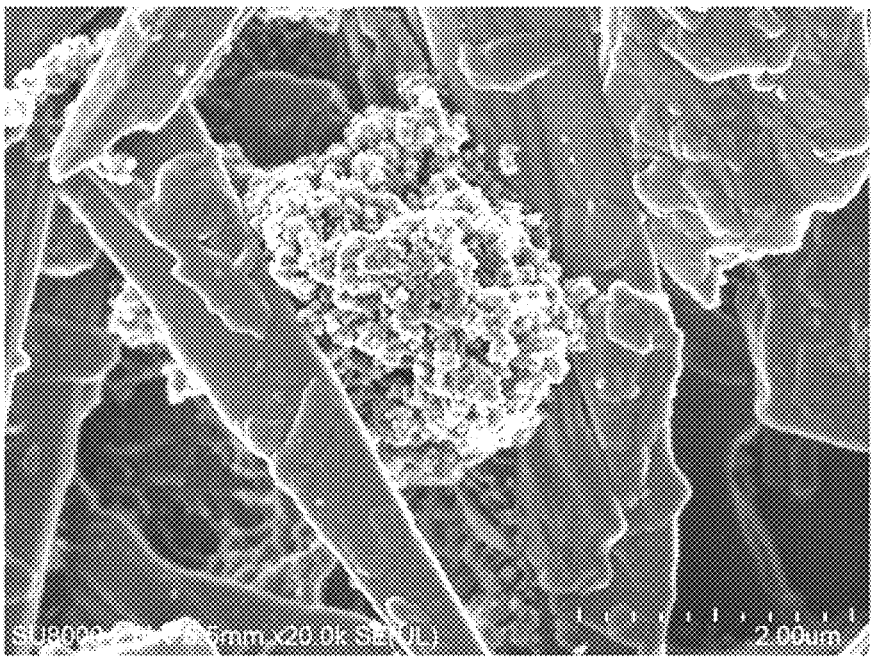
Comparative Example 2

[FIG. 2]
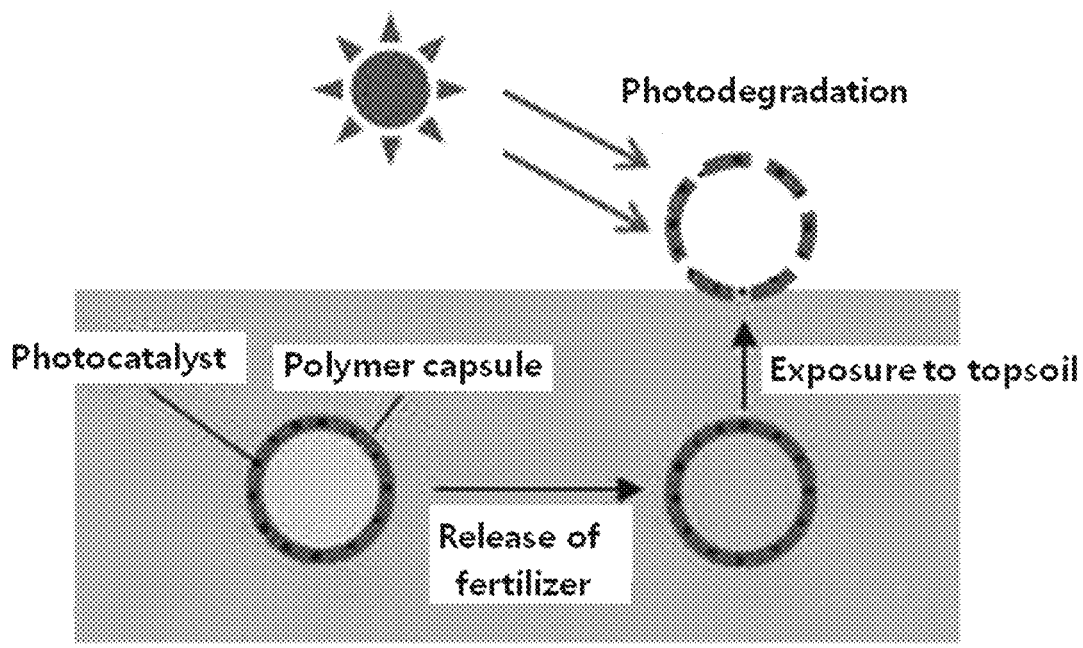

CONTROLLED-RELEASE FERTILIZERS

CROSS-REFERENCE TO RELATED APPLICATION(S)

This application is a 35 U.S.C. 371 National Phase Entry Application from PCT/KR2018/015866, filed on Dec. 13, 2018, designating the United States and which claims the benefits of filing dates of Korean Patent Application No. 10-2017-0172272 filed with Korean Intellectual Property Office on Dec. 14, 2017 and Korean Patent Application No. 10-2018-0160288 filed with Korean Intellectual Property Office on Dec. 12, 2018, the entire contents of which are incorporated herein by reference.

TECHNICAL FIELD

The present invention relates to a controlled-release fertilizer. More specifically, the present invention relates to a controlled-release fertilizer having high stability against moisture and a rigid structure, and that is capable of easily controlling a release period of a fertilizer and of further realizing excellent photodegradation efficiency.

BACKGROUND ART

Various controlled-release fertilizers have been developed for the purpose of labor-saving fertilization, or for improving the effect of a fertilizer according to the growth of plants. In these controlled-release fertilizers (CRF), fertilizer components such as nitrogen, phosphorus, and potassium are slowly supplied to crops over a long period of time.

With conventional fertilizers, which are sprayed by mixing them with water or broadcast in the form of powder, it is usually difficult to sustain the effect for more than 20 days when sprayed once.

This is because fertilizer components are washed away by rain or deeply penetrate underground, and thus it is difficult for crops to absorb the fertilizer components. Because of these problems, the fertilizer is frequently applied in an excessive amount.

In order to complement the drawbacks of such general fertilizer, controlled-release fertilizer reduces the release rate of the fertilizer components with a polymer capsule so as to be released over a long period of time.

The polymer capsule is made of olefin-based resins, urethane-based resin, latex, acrylic resin, etc. When water vapor penetrates through the capsules, the fertilizer components are dissolved, and then pass through the capsules and are released by osmotic pressure.

The penetration rate of water and the fertilizer components varies depending on the components for preparing the capsules, and the thickness of the capsules.

This can be used to control the rate at which the fertilizer components are released to the outside.

The period during which the fertilizer components are released from the capsule can be adjusted from a minimum of 30 days to a maximum of 2 years.

However, there is a problem that the capsule polymer remains in soils or in streams without being decomposed after the release of the fertilizer.

In order to solve these problems, attempts have been made to use a biodegradable polymer as a capsule material. However, because biodegradable polymers have rapid moisture penetration and are decomposed by microorganisms within a period of 1 month to 6 months, thus are not suitable to be used in the controlled-release fertilizers which must be released over a period from a minimum of 1 month to 2 years.

DETAILED DESCRIPTION OF THE INVENTION

Technical Problem

An object of the present invention is intended to provide a controlled-release fertilizer having high stability against moisture and a rigid structure, and that is capable of easily controlling a release period of a fertilizer, and of further realizing excellent photodegradation efficiency.

Technical Solution

There is provided a controlled-release fertilizer, including: a photodegradable capsule including a binder resin containing a polyolefin and an ethylene vinyl acetate copolymer; and a photocatalytic composite in which a (co)polymer including at least one repeating unit selected from the group consisting of an ethylene repeating unit and a vinyl acetate repeating unit is bonded to the surface or inside of agglomerates of inorganic fine particles, and a fertilizer contained in a space surrounded by the photodegradable capsule.

Hereinafter, the controlled-release fertilizer according to specific embodiments of the present invention will be described in more detail.

As used herein, the (co)polymer means including both a polymer and a copolymer.

According to one embodiment of the present invention, a controlled-release fertilizer is provided, including: a photodegradable capsule including a binder resin containing a polyolefin and an ethylene vinyl acetate copolymer; and a photocatalytic composite in which a (co)polymer including at least one repeating unit selected from the group consisting of an ethylene repeating unit and a vinyl acetate repeating unit is bonded to the surface or inside of agglomerates of inorganic fine particles, and a fertilizer contained in a space surrounded by the photodegradable capsule.

The present inventors confirmed through experimentation that the controlled-release fertilizer in which the photodegradable capsule including the photocatalytic composite described above together with the binder resin containing a polyolefin and an ethylene vinyl acetate copolymer has been formed can have high stability against moisture and a rigid structure, and is capable of easily controlling a release period of a fertilizer and of further realizing excellent photodegradation efficiency, thereby completing the present invention.

The above-described controlled-release fertilizer is also characterized in that the photocatalytic composite is uniformly dispersed in the binder resin described above.

Specifically, as the (co)polymer including at least one repeating unit selected from the group consisting of an ethylene repeating unit and a vinyl acetate repeating unit is bonded to the surface or inside of agglomerates of inorganic fine particles, the inorganic fine particles can be uniformly dispersed during the manufacturing process of the controlled-release fertilizer or in the controlled-release fertilizer, and accordingly, the agglomerates of inorganic fine particles may have a particle size that is not too large.

As the aggregates of inorganic fine particles are uniformly dispersed in the binder resin with a particle size that is not too large, a photodegradation reaction occurs locally when the photodegradable capsule is exposed to light, which may prevent the deterioration of photodegradation efficiency and also prevent the photodegradable capsule from remaining in the soil.

This may be attributed to the binding of the co(polymer) including at least one repeating unit selected from the group consisting of an ethylene repeating unit and a vinyl acetate repeating unit to the surface or inside of the agglomerates of inorganic fine particles.

That is, as the (co)polymer is bonded to the surface or inside of the agglomerates of inorganic fine particles, the growth of the agglomerates of inorganic fine particles may be controlled, and also, the (co)polymer may have higher compatibility with the binder resin due to the characteristics thereof, so that the photocatalytic composite can be uniformly distributed in the binder resin.

As described above, the controlled-release fertilizer can realize excellent photodegradation efficiency.

More specifically, when light having a wavelength of 300 to 800 nm is irradiated at an intensity of 400 w/m² for 224 hours, the controlled-release fertilizer may have a decomposition rate of the binder resin of 40% or more, or 50% or more, which can be derived from the change in weight of the photodegradable capsule.

The inorganic fine particles may act as a photocatalyst.

The controlled-release fertilizer of the embodiment is characterized in that the photocatalytic composite is uniformly dispersed in the binder resin in order to solve the problem that the photodegradable capsule remains in the soil.

The photocatalytic composite can act as a catalyst only when receiving light. Therefore, the fertilizer is gradually released for a release period in the state where the photodegradable capsule is not decomposed, during release of the fertilizer in the soil where light is blocked.

Then, when the controlled-release fertilizer is exposed to the topsoil by plowing, etc., after the fertilizer has been released, the photodegradable capsule may be decomposed by light.

The inorganic fine particle may include a primary particle having a cross-sectional diameter of 5 to 50 nm.

The cross-sectional diameter of the primary particles of the inorganic fine particles may be confirmed by a commonly known method, for example, through a TEM image or a BET measurement.

If the cross-sectional diameter of the primary particles included in the inorganic fine particles is too small, the degree of crystallization may decrease, thereby deteriorating the photodegradation efficiency.

In addition, if the cross-sectional diameter of the primary particles included in the inorganic fine particles is too large, the specific surface area of the photocatalyst particles may decrease, thereby deteriorating the photodegradation efficiency.

Meanwhile, the agglomerates of inorganic fine particles included in the controlled-release fertilizer of the embodiment may have a particle size that is not too large. Specifically, the agglomerates of inorganic fine particles may have a cross-sectional diameter of 1 μm or less, or a cross-sectional diameter of 0.05 μm to 0.5 μm.

The cross-sectional diameter and diameter of the agglomerates of inorganic fine particles may be confirmed by a commonly known method, for example, a SEM or TEM microtome.

If the cross-sectional diameter or the overall size of the agglomerates of inorganic fine particles is too large, photodegradation reaction may occur locally in the photodegradable capsule, or the photodegradation reaction efficiency may be deteriorated. In addition, due to the inefficient photodegradation reaction, the photodegradable capsule may not be entirely decomposed and a residue may remain.

Specific examples of the inorganic fine particles include titanium dioxide ($TiO_2$), zinc oxide (ZnO), or a mixture thereof.

Meanwhile, the binder resin may be used a main material for forming the outer structure of the photodegradable capsule, and as described above, the binder resin may include a polyolefin and an ethylene vinyl acetate copolymer.

Examples of the polyolefin are not particularly limited, and may include, for example, a high-density or low-density polyethylene, a linear low-density polyethylene, a polypropylene, an ethylene-propylene copolymer, a polybutene, a butene-ethylene copolymer, a butene-propylene copolymer, a mixture of two or more thereof, or a copolymer of two or more thereof.

The ethylene vinyl acetate copolymer included in the binder resin is not particularly limited, and for example, an ethylene vinyl acetate copolymer containing 1 to 45% by weight of a vinyl acetate repeating unit may be used.

Further, the ethylene vinyl acetate copolymer may have a melt index of 0.5 g/10 min to 5.0 g/10 min or 1.0 g/10 min to 3.0 g/10 min, as measured at 190° C. under a load of 2.16 kg according to ASTM D1238.

The weight ratio between the polyolefin and the ethylene vinyl acetate copolymer included in the binder resin is not particularly limited, and for example, the binder resin may include the polyolefin:ethylene vinyl acetate copolymer in a weight ratio of 1:1 to 6:1.

As such, as the binder resin includes the polyolefin resin in an equivalent amount or in a higher amount than the ethylene vinyl acetate copolymer, the release rate of the fertilizer may be more easily controlled.

Meanwhile, the photocatalytic composite may have a structure in which the (co)polymer including at least one repeating unit selected from the group consisting of an ethylene repeating unit and a vinyl acetate repeating unit is bonded to the surface or inside of the agglomerates of inorganic fine particles.

As described above, the agglomerates of inorganic fine particles can act as a photocatalyst, and when the controlled-release fertilizer is exposed to the surface of the soil or the like, the photodegradation reaction can be initiated in the photodegradable capsule.

The (co)polymer including at least one repeating unit selected from the group consisting of an ethylene repeating unit and a vinyl acetate repeating unit is bonded to the surface or inside of the agglomerates of inorganic fine particles, and consequently, it prevents the agglomerates of inorganic fine particles from growing excessively and enables the (co)polymer to have higher compatibility with the binder resin so that the photocatalytic composite can be uniformly dispersed in the binder resin.

The (co)polymer including at least one repeating unit selected from the group consisting of an ethylene repeating unit and a vinyl acetate repeating unit may include an ethylene repeating unit, a vinyl acetate repeating unit, or both.

Specific examples of the (co)polymer including at least one repeating unit selected from the group consisting of an ethylene repeating unit and a vinyl acetate repeating unit include an ethylene vinyl acetate copolymer. Further, an ethylene vinyl acetate copolymer containing 1 to 45% by weight of a vinyl acetate repeating unit may be used.

Furthermore, the ethylene vinyl acetate copolymer may have a melt index of 0.5 g/10 min to 5.0 g/10 min or 1.0 g/10 min to 3.0 g/10 min, as measured at 190° C. under a load of 2.16 kg according to ASTM D1238.

The photocatalytic composite may be prepared by dispersing the inorganic fine particles and the (co)polymer including at least one repeating unit selected from the group consisting of an ethylene repeating unit and a vinyl acetate repeating unit in an organic solvent.

In the photocatalytic composite, the weight ratio between the agglomerates of inorganic fine particles and the (co)polymer is not particularly limited, and the weight ratio or the like can be adjusted by controlling the amount dispersed in the organic solvent according to the characteristics of the controlled-release fertilizer.

For example, the photocatalytic composite may contain 1 to 500 parts by weight or 20 to 200 parts by weight of the (co)polymer including at least one repeating unit selected from the group consisting of an ethylene repeating unit and a vinyl acetate repeating unit relative to 100 parts by weight of the agglomerates of inorganic fine particles.

Meanwhile, the agglomerates of inorganic fine particles may be contained in an amount of 0.1 to 8 parts by weight relative to 100 parts by weight of the binder resin.

If the content of the agglomerates of inorganic fine particles relative to the binder resin in the photodegradable capsule is too low, the efficiency of the photodegradation reaction may be lowered, and due to the insufficient photodegradation reaction, the photodegradable capsule may not be entirely decomposed and a residue may remain.

Further, if the content of the agglomerates of inorganic fine particles relative to the binder resin in the photodegradable capsule is too large, the agglomerate of inorganic fine particles may excessively grow, and consequently, a photodegradation reaction may occur locally in the photodegradable capsule, or the efficiency of the photodegradation reaction may be lowered. Thereby, due to the insufficient photodegradation reaction, the photodegradable capsule may not be entirely decomposed and a residue may remain.

Meanwhile, the controlled-release fertilizer may further include a filler dispersed in the binder resin.

The type of filler is not particularly limited, and for example, the filler may include talc, bentonite, loess, diatomaceous earth, silica, aluminosilicate, kaolinite, starch, carbon, or a mixture thereof.

The content of the filler is not limited, and the controlled-release fertilizer may be contained in an amount of 25 to 75% by weight relative to the total weight of the photodegradable capsule, in consideration of the mechanical properties and structural stability of the photodegradable capsule.

The fertilizer may be various known fertilizers, for example, a urea or compound fertilizer.

In a preferred embodiment, the fertilizer may be a granular core fertilizer having a granular form in order to be easily included in the photodegradable capsule.

The specific types of the fertilizer are not limited, and commonly known fertilizers may be used.

Preferable examples thereof include nitrogen-containing organic compounds such as urea, aldehyde condensation urea, isobutyl aldehyde condensation urea, formaldehyde condensation urea, guanylurea sulfate, and oxamide, ammonium, and nitric compounds such as ammonium nitrate, ammonium dihydrogen phosphate, diammonium hydrogen phosphate, ammonium sulfate, ammonium chloride, and sodium nitrate, potassium salts such as potassium nitrate, potassium phosphate, potassium sulfate, and potassium chloride, calcium salts such as calcium phosphate, calcium sulfate, calcium nitrate, and calcium chloride, magnesium salts such as magnesium nitrate, magnesium chloride, magnesium phosphate, and magnesium sulfate, iron salts such as ferrous nitrate, ferric nitrate, ferrous phosphate, ferric phosphate, ferrous sulfate, ferric sulfate, ferrous chloride, and ferric chloride, and double salts thereof or a mixture of two or more thereof.

The content of the fertilizer in the controlled-release fertilizer is not particularly limited, and for example, it may be contained in an amount of 200 to 3000 parts by weight relative to 100 parts by weight of the photodegradable capsule.

The photocatalytic composite may have a specific degree of dispersion in the photodegradable capsule.

More specifically, the photocatalytic composite may be prepared by dispersing the inorganic fine particles and the (co)polymer including at least one repeating unit selected from the group consisting of an ethylene repeating unit and a vinyl acetate repeating unit in an organic solvent.

By transferring strong energy by sonication, a high-shear mixer or a bead mill, etc., in the state where the inorganic fine particles and the (co)polymer are dispersed in an organic solvent, the (co)polymer may be bonded to the surface or inside of the agglomerates of inorganic fine particles.

The photocatalytic composite thus prepared may be very uniformly dispersed in the binder resin, and the degradation efficiency of the photocatalyst may be remarkably enhanced.

The controlled-release fertilizer may further include a component included in known controlled-release fertilizers. For example, the component may include, but is not limited to, an amphipathic polymer, etc.

The controlled-release fertilizer may be provided through various preparation methods. For example, it may be prepared through the steps of: preparing a dispersion solution of the photocatalytic composite by dispersing the inorganic fine particles in an organic solvent to which an ethylene vinyl acetate copolymer is added; preparing a coating composition by mixing a polyolefin, an ethylene vinyl acetate copolymer, the dispersion solution of the photocatalytic composite, and optionally a filler; and coating the surface of the granular fertilizer core with the coating composition.

Specific examples of the organic solvent are not particularly limited, and tetrachloroethylene (TCE), cyclohexene (CHN), dichloromethane (DCM), 1,2,4-trichlorobenzene (TCB), or the like may be used.

In the step of preparing a dispersion solution of the photocatalytic composite by dispersing the inorganic fine particles in an organic solvent to which an ethylene vinyl acetate copolymer is added, the dispersion solution may be prepared using strong energy, such as sonication or a bead mill, etc. For example, a dispersion solution having a dispersion particle size of 5 to 1000 nm may be prepared by using strong energy such as sonication or the like.

Advantageous Effects

According to the present invention, a controlled-release fertilizer having high stability against moisture and a rigid structure, and that is capable of easily controlling a release period of a fertilizer and of further realizing excellent photodegradation efficiency, may be provided.

The controlled-release fertilizer may prevent soil contamination by preventing a photodegradable capsule or a hydrophilic polymer from remaining in the soil.

BRIEF DESCRIPTION OF DRAWINGS

FIG. 1 shows SEM images of agglomerates of fine particles in the photocatalytic composite included in the controlled-release fertilizer of Example 1 and agglomerates of fine particles included in the coated fertilizer of Comparative Example 2.

FIG. 2 schematically shows the photodegradation mechanism of the controlled-release fertilizer.

DETAILED DESCRIPTION OF THE EMBODIMENTS

The present invention will be described in more detail by way of examples shown below. However, these examples are given for illustrative purposes only, and the scope of the invention is not intended to be limited to or by these examples.

Examples: Preparation of Controlled-Release Fertilizer

Examples 1 to 3

(1) Preparation of Photocatalytic Composite 1.5 g of an ethylene vinyl acetate copolymer [MI (melt index, 190° C., load of 2.16 kg, ASTM D1238): about 1.8 g/10 min, D (density): 0.94 g/cm$^3$, vinyl acetate content at about 20 wt %, melting point of 85° C.] was dissolved in tetrachloroethylene, to which TiO$_2$ (average particle diameter of primary particle: 21 nm) was mixed in an amount shown in Table 1 below, and subjected to sonication to prepare a dispersion solution of a photocatalytic composite coated with the ethylene vinyl acetate copolymer.

(2) Preparation of Controlled-Release Fertilizer

The thus-prepared dispersion solution of the photocatalytic composite, polyethylene [LDPE, MI (melt index, 190° C., load of 2.16 kg, ASTM D1238): about 8 g/10 min, D (density): 0.925 g/cm$^3$], an ethylene vinyl acetate copolymer [MI (melt index, 190° C., load of 2.16 kg, ASTM D1238): about 1.8 g/10 min, D (density): 0.94 g/cm$^3$, vinyl acetate content of about 20 wt %, melting point of 85° C.], and talc were used in an amount shown in Table 1 below, and were uniformly stirred and mixed with tetrachloroethylene at 100° C. in the composition ratio shown in Table 1 below to prepare a coating solution having a solid concentration of 5 wt %.

Then, the coating solution was applied to the nitrogen fertilizer particles using a fluid bed drier to prepare a controlled-release coated fertilizer (Examples 1 to 3).

Comparative Examples 1 and 2: Preparation of Coated Fertilizer

Comparative Example 1

Polyethylene [LDPE, MI (melt index, 190° C., load of 2.16 kg, ASTM D1238): about 8 g/10 min, D (density): 0.925 g/cm$^3$], an ethylene vinyl acetate copolymer [MI (melt index, 190° C., load of 2.16 kg, ASTM D1238): about 1.8 g/10 min, D (density): 0.94 g/cm$^2$, vinyl acetate content of about 20 wt %, melting point of 85° C.], and talc were used in an amount shown in Table 1 below, and were uniformly stirred and mixed with tetrachloroethylene at 100° C. in the composition ratio shown in Table 1 below to prepare a coating solution having a solid concentration of 5 wt %.

Then, the coating solution was applied to the nitrogen fertilizer particles using a fluid bed drier to prepare a coated fertilizer (Comparative Example 1).

Comparative Example 2

TiO$_2$ (average particle diameter of primary particle: 21 nm), polyethylene [LDPE, MI (melt index, 190° C., load of 2.16 kg, ASTM D1238): about 8 g/10 min, D (density): 0.925 g/cm$^3$], ethylene vinyl acetate copolymer [MI (melt index, 190° C., load of 2.16 kg, ASTM D1238): about 1.8 g/10 min, D (density): 0.94 g/cm$^3$, vinyl acetate content of about 20 wt %, melting point of 85° C.], and talc were used in an amount shown in Table 1 below, and were uniformly stirred and mixed with tetrachloroethylene at 100° C. in the composition ratio shown in Table 1 below to prepare a coating solution having a solid concentration of 5 wt %.

Then, the coating solution was applied to the nitrogen fertilizer particles using a fluid bed drier to prepare a coated fertilizer (Comparative Example 2).

EXPERIMENTAL EXAMPLE

Experimental Example 1: Comparison Test of Photodegradation Property 5 g of each of the controlled-release fertilizers of the examples and the coated fertilizers of the comparative examples was taken, and a pinhole was made with a needle one by one to completely release the fertilizers. Then, the degradation evaluation was carried out with the remaining coating films.

Light having a wavelength of 300 nm to 800 nm was irradiated to the coating film at an intensity of 400 w/m$^2$ at a temperature of 50° C. using Suntest CPS+ equipment (ATLAS).

Then, the decomposition rate of the binder resin, which could be derived from the change in weight of the coating film during irradiation of light for 224 hours under the above conditions, was determined by the following General Formula 1, and the results are shown in Table 1 below.

$$\text{Decomposition rate of binder resin} = \frac{\text{Change in weight of coating film after } UV \text{ irradiation}}{\text{Weight of resin in the coating film before } UV \text{ irradiation } (LDPE + EVA)} \times 100\% \quad \text{[General Formula 1]}$$

TABLE 1

|  | Comparative Example 1 | Comparative Example 2 | Example 1 | Example 2 | Example 3 |
| --- | --- | --- | --- | --- | --- |
| Polyethylene (LDPE) | 30 g | 30 g | 30 g | 30 g | 29 g |
| EVA copolymer | 13 g | 13 g | 13 g | 13 g | 8 g |
| TALC | 57 g | 57 g | 57 g | 57 g | 63 g |
| TiO$_2$ | 0 | 0.86 g | 0.86 g | 0.43 g | 0.75 g |

TABLE 1-continued

|  | Comparative Example 1 | Comparative Example 2 | Example 1 | Example 2 | Example 3 |
|---|---|---|---|---|---|
| TiO$_2$ dispersion treatment | — | X | ○ (EVA 1.5 g) | ○ (EVA 1.5 g) | ○ (EVA 1.5 g) |
| decomposition rate of binder resin (%) | 0 | 33.7 ± 15 | 67.4 ± 3 | 58.7 ± 3 | 42.5 ± 3 |

As shown in Table 1, it was confirmed that the controlled-release fertilizers of the examples showed a decomposition rate of the binder resin of 40% or more, or 55% or more, when irradiated with light having a wavelength of 300 to 800 nm at an intensity of 400 w/m$^2$ for 224 hours. In contrast, it was also confirmed that the coated fertilizers of the comparative examples showed a decomposition rate of the binder resin of 35% or less.

Experimental Example 2: Evaluation of Releasing Property of Fertilizer 12.5 g of each of the controlled-release fertilizers of the examples and the coated fertilizer of the comparative examples was added to 250 ml of distilled water to prepare a sample. Then, 1 ml of the liquid was taken from the sample at 25° C. on different days, and the nitrogen content in the sample was analyzed (Kjeltec Analyzer 2300) to measure the amount of the fertilizer released.

TABLE 2

| | Day on which the nitrogen release was evaluated (release rate %) | | | | |
|---|---|---|---|---|---|
| | Day 1 | Day 10 | Day 20 | Day 30 | Day 50 |
| Comparative Example 1 | 4 | 31 | 55 | 69 | 90 |
| Example 1 | 3 | 21 | 39 | 51 | 69 |

As shown in Table 2, it was confirmed that the controlled-release fertilizers of the comparative example 1 exhibited a release rate of 50% or more after 20 days and a release rate of 90% or more after 50 days. In contrast, it was also confirmed that the coated fertilizers of the example 1 showed a release rate of less than 40% after 20 days and a release rate of less than 70% or less even at day 50.

Experimental Example 3: Measurement of z-Average Dispersion Particle Size of TiO$_2$ The z-average dispersion particle size of TiO$_2$ in the dispersion solution of the photocatalytic composite of Example 1 and the dispersion solution containing TiO$_2$ of Comparative Example 2 was measured using a dynamic light scattering instrument (Malvern Zetasizer Nano ZS90). The results are shown in Table 3.

TABLE 3

| z-average dispersion particle size of TiO$_2$ | | |
|---|---|---|
| | Example 1 | Comparative Example 2 |
| z-average dispersion particle size of TiO$_2$ (nm) | 330 | 1.7 to 3.2 × 10$^4$ |

As shown in Table 3, the dispersion solution of the photocatalytic composite of Example 1 had a z-average dispersion particle size of about 300 nm, confirming that TiO$_2$ particles used were homogeneously dispersed and that agglomerates of inorganic fine particles having a relatively small average particle size were formed. This can also be confirmed through the SEM image (top) of FIG. 1, which shows the photocatalytic composite of Example 1 using a SEM (Hitachi, S-4800).

In contrast, the dispersion solution containing TiO$_2$ of Comparative Example 2 had a z-average dispersion particle size of about 10,000 nm, confirming that agglomerates of inorganic fine particles having a relatively large average particle size were formed. This can also be confirmed through the SEM image of FIG. 1, which shows the agglomerates of fine particles included in the coated fertilizer of Comparative Example 2.

The invention claimed is:

1. A controlled-release fertilizer, comprising: a photodegradable capsule and a fertilizer encapsulated by the photodegradable capsule, the photodegradable capsule including a binder resin containing a polyolefin and an ethylene vinyl acetate copolymer, and a photocatalytic composite dispersed in the binder resin,
    wherein the photocatalytic composite comprises agglomerates of inorganic fine particles and a (co)polymer including at least one repeating unit selected from the group consisting of an ethylene repeating unit and a vinyl acetate repeating unit, the (co)polymer bonded to a surface or inside of the agglomerates of the inorganic fine particles, and
    wherein the agglomerates of inorganic fine particles have a cross-sectional diameter of 0.05 µm to 0.5 µm.

2. The controlled-release fertilizer of claim 1,
    further comprising a filler dispersed in the binder resin.

3. The controlled-release fertilizer of claim 2,
    wherein the filler is at least one selected from the group consisting of talc, bentonite, loess, diatomaceous earth, silica, aluminosilicate, kaolinite, starch, and carbon.

4. The controlled-release fertilizer of claim 2,
    comprising the filler in an amount of 25 to 75% by weight based on the total weight of the photodegradable capsule.

5. The controlled-release fertilizer of claim 1,
    wherein the photodegradable capsule has a decomposition rate of the binder resin of 40% or more, determined as a change in weight of the photodegradable capsule before and after irradiation with light having a wavelength of 300 to 800 nm at an intensity of 400 W/m$^2$ at a temperature of 50° C. for 224 hours.

6. The controlled-release fertilizer of claim 1,
    wherein the inorganic fine particles include a primary particle having a cross-sectional diameter of 5 to 50 nm.

7. The controlled-release fertilizer of claim 1,
    wherein the cross-sectional diameter of the agglomerates of inorganic fine particles is 0.05 µm to 0.330 µm.

8. The controlled-release fertilizer of claim 1, wherein the inorganic fine particles are titanium dioxide ($TiO_2$), zinc oxide (ZnO), or a mixture thereof.

9. The controlled-release fertilizer of claim 1, wherein the photocatalytic composite contains 1 to 500 parts by weight of the (co)polymer including at least one repeating unit selected from the group consisting of an ethylene repeating unit and a vinyl acetate repeating unit based on 100 parts by weight of the agglomerates of inorganic fine particles.

10. The controlled-release fertilizer of claim 1, comprising 0.1 to 8 parts by weight of the agglomerates of inorganic fine particles based on 100 parts by weight of the binder resin.

11. The controlled-release fertilizer of claim 1, wherein the binder resin comprises the polyolefin and the ethylene vinyl acetate copolymer in a weight ratio of 1:1 to 6:1.

12. The controlled-release fertilizer of claim 1, wherein the polyolefin is at least one selected from the group consisting of a high-density or low-density polyethylene, a linear low-density polyethylene, a polypropylene, an ethylene-propylene copolymer, a polybutene, a butene-ethylene copolymer, and a butene-propylene copolymer.

13. The controlled-release fertilizer of claim 1, wherein the ethylene vinyl acetate copolymer contains 1 to 45% by weight of the vinyl acetate repeating unit.

14. The controlled-release fertilizer of claim 1, wherein the (co)polymer including at least one repeating unit selected from the group consisting of an ethylene repeating unit and a vinyl acetate repeating unit includes an ethylene vinyl acetate copolymer.

15. The controlled-release fertilizer of claim 1, wherein the fertilizer is a granular fertilizer.

16. The controlled-release fertilizer of claim 1, comprising the fertilizer in an amount of 200 to 3000 parts by weight based on 100 parts by weight of the photodegradable capsule.

17. A method for preparing the controlled-release fertilizer of claim 1, comprising the steps of: dispersing the inorganic fine particles and the (co)polymer including at least one repeating unit selected from the group consisting of an ethylene repeating unit and a vinyl acetate repeating unit in an organic solvent to prepare a dispersion solution of the photocatalytic composite in which the (co)polymer is bonded to the surface or inside of the agglomerates of inorganic fine particles;

mixing the polyolefin, the ethylene vinyl acetate copolymer, the dispersion solution of the photocatalytic composite, and optionally a filler to prepare a coating composition; and coating the fertilizer with the coating composition so as to prepare the controlled-release fertilizer.

\* \* \* \* \*